United States Patent [19]

Prochazka

[11] 4,005,235
[45] Jan. 25, 1977

[54] DENSE SINTERED BORON CARBIDE CONTAINING BERYLLIUM CARBIDE

[75] Inventor: Svante Prochazka, Ballston Lake, N.Y.

[73] Assignee: General Electric Company, Schenectady, N.Y.

[22] Filed: Nov. 17, 1975

[21] Appl. No.: 632,496

[52] U.S. Cl. .............................. 428/36; 29/182.7; 29/182.8; 106/43; 428/538; 428/539
[51] Int. Cl.² .................. C04B 35/52; B22F 3/00
[58] Field of Search ............... 106/43; 428/36, 538, 428/539; 29/182.7, 182.8

[56] References Cited

UNITED STATES PATENTS

| 3,729,372 | 4/1973 | Matchen et al. | 106/43 |
| 3,730,827 | 5/1973 | Matchen et al. | 106/43 |
| 3,796,564 | 3/1974 | Taylor et al. | 29/182.7 |
| 3,857,744 | 12/1974 | Moss | 106/43 |
| 3,914,371 | 10/1975 | Benton et al. | 29/182.8 |

Primary Examiner—George F. Lesmes
Assistant Examiner—William R. Dixon, Jr.
Attorney, Agent, or Firm—Jane M. Binkowski; Joseph T. Cohen; Jerome C. Squillaro

[57] ABSTRACT

A polycrystalline boron carbide sintered body containing beryllium carbide with a density ranging from 85% to 96% of the theoretical density of boron carbide and having a uniform microstructure of equiaxed grains.

4 Claims, 2 Drawing Figures

DENSE SINTERED BORON CARBIDE CONTAINING BERYLLIUM CARBIDE

The invention herein described was made in the course of or under a contract or subcontract thereunder (or grant) with the Department of the Navy.

This invention relates to a novel polycrystalline sintered body of boron carbide with crystallites of beryllium carbide, $Be_2C$, distributed therein.

$B_4C$ is a very hard, lightweight solid (Knoop Hardness number 3500–4500, specific weight 2.52 g/cc) and has been used mainly as an abrasive. In polycrystalline form it has been applied as armor for helicopters, as wear resistant linings such as sandblasting nozzles and control rods in reactors.

Polycrystalline $B_4C$ is prepared exclusively by hot-pressing of $B_4C$ powder in graphite dies at 2000° C and above at pressures of 3000–5000 psi. Under these conditions densification close to the theoretical density is usually obtained. In hot-pressing, the sinterability depends on the carbon to boron ratio. While the sinterability increases with the increase of the C/B ratio some properties, such as hardness, are degraded. On the other hand, boron-rich hot-pressed $B_4C$ shows favorable hardness, however, it is difficult to densify under nominal hot-pressing conditions. Therefore, practical hot-pressing compositions are close to the stoichiometric boron to carbon ratio corresponding to $B_4C$. Since hot-pressing requires high pressures and temperatures necessitating expensive energy consuming machinery, it is not a suitable method for large scale-production. Also hot-pressing yields pressed bodies in the form of billets of simple geometric shape only which require time-consuming machining with diamond abrasives to produce a complex shaped part.

The present invention makes it possible to fabricate complex shaped articles of boron carbide directly without requiring machining.

Briefly stated, the present sintered body is produced by admixing boron carbide submicron powder with beryllium carbide submicron powder to produce a significantly uniform mixture, pressing the mixture to form a green body of the desired shape and sintering the green body at a temperature ranging from abut 2200° to 2280° C to produce a sintered body having a density of at least 85% of the theoretical density of boron carbide.

Those skilled in the art will gain a further and better understanding of the present invention from the detailed description set forth below, considered in conjunction with the figures accompanying and forming a part of the specification, in which.

Figure 1:
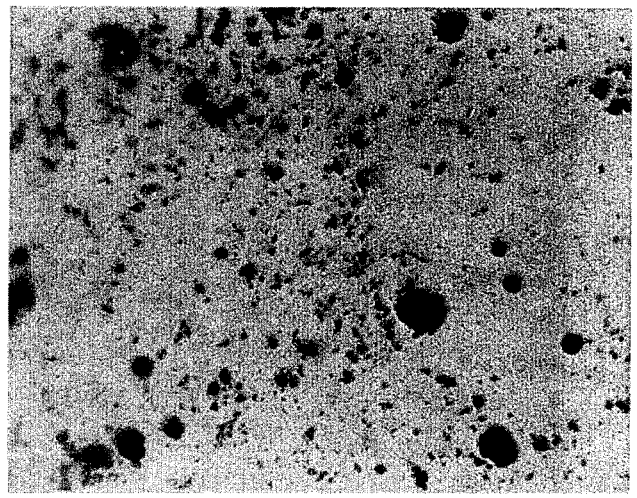
FIG. 1 is a photomicrograph (magnified 500 X) of a sectioned and polished surface of the present sintered body prepared by sintering $B_4C$ with 1% $Be_2C$ at 2280° C in argon-nitrogen atmosphere to 94% theoretical density.

The boron carbide powder used to produce the present product is preferably of stoichiometric $B_4C$ composition but it can be of a composition wherein the boron/carbide molar ratio ranges from 3.5 to 4.5. The powder should have an average particle size of about 0.2 micron or less. Also, it should be free of oxygen or contain oxygen in an amount less than 1% by weight of the boron carbide. Oxygen content is determinable by standard techniques and it is generally present in the form of an oxide. To reduce oxygen content, the boron carbide powder is preferably calcined in a vacuum or inert gas such as argon at a temperature ranging from about 1400° C to 1600° C.

Commercially prepared boron carbide powder is useful in the present invention since the metallic impurities normally present in such powder do not inhibit its sinterability. Specifically, commercially prepared boron carbide powder having an average particle size of about 0.2 micron or less may contain carbide-forming metals such as Mg and Al used in the synthesis of the boron carbide and other metallic impurities such as Fe, Ni and Co.

Beryllium carbide, $Be_2C$, is used as a sintering agent to produce the present sintered product. For best results, i.e. to attain the most uniform microstructure, it should have an average particle size the same as or preferably finer than that of the boron carbide. However, $Be_2C$ having an average particle size up to twice that of the boron carbide is operable to produce the present sintered product. Beryllium carbide is used in an amount ranging from about 0.5% by weight to 3% by weight of boron carbide. Amounts of beryllium carbide in excess of 3% by weight of boron carbide do not provide any advantage.

The boron carbide powder is admixed with beryllium carbide powder to produce at least a significantly uniform and preferably a substantially uniform mixture. The boron carbide and beryllium carbide powders can be admixed by a number of techniques and under conditions which have no significant deteriorating effect on their properties such as, for example, ball milling or jet milling, in a dry inert atmosphere such as dry air or argon to prevent hydrolyzation of the beryllium carbide.

A number of techniques can be used to shape the powder mixture into a green body. For example, the powder mixture can be extruded, injection molded, die-pressed, isostatically pressed or slip cast to produce the green body of desired shape. Any lubricants, binders or similar materials used in shaping the powder mixture should have no significant deteriorating effect on the properties of the components of the green body or the resulting sintered body. Such materials are preferably of the type which evaporate on heating at relatively low temperatures, preferably below 200° C, leaving no significant residue. The green body, preferably, should have a density of at least 50% of the theoretical density for boron carbide to promote densification during sintering and achieve attainment of the desired density of at least 85%.

Sintering of the green body is carried out in an atmosphere in which it is substantially inert, i.e. an atmosphere which has no significant deteriorating effect on its properties such as, for example, argon, helium, nitrogen or a vacuum. The sintering atmosphere is preferably at atmospheric pressure.

Sintering is carried out at a temperature ranging from about 2200° C to about 2280° C. The particular sintering temperature is determinable empirically and depends largely on particle size, density of the green body, and final density desired in the sintered product with higher final densities requiring higher sintering temperatures. Sintering temperatures lower than 2200° C do not produce the present sintered body with a density of at least 85%. Temperatures higher than 2280° C are not suitable as a practical matter since the green body is ordinarily sintered in a high temperature carbon element resistance furnace and at a temperature of about 2300° C melts in contact with carbon.

The sintered body of the present invention is polycrystalline and has a substantially uniform microstructure. It is composed of a major amount of the boron carbide phase, i.e. at least 95% by weight and usually about 97% to 99% by weight of the sintered body, and a minor amount of beryllium carbide phase, i.e. from 0.5% to 3% by weight of the boron carbide phase. The boron carbide phase is in the form of equiaxed grains ranging in size from about 30 microns to 300 microns. The boron carbide phase can be of a composition wherein the boron/carbon molar ratio ranges from 3.5 to 4.5, but preferably, it is of stoichiometric $B_4C$ composition. The beryllium carbide phase is in the form of crystallites which may range in size up to about 10 microns but generally have a size of about 1 micron to 2 microns. The beryllium carbide crystallites are distributed substantially uniformly throughout the boron carbide phase. The $Be_2C$ phase is detectable by X-ray analysis, or for lower contents of $Be_2C$, by electron microprobe analysis.

The sintered body of the present invention has a density ranging from 85% to about 96% of the theoretical density for $B_4C$. A sintered body with a density higher than 96% is not attainable as a practical matter since the sintering temperatures required to produce the present product are close to the melting point of $B_4C$ causing rapid grain growth.

The present sintered body having a density of 90% or higher and wherein most of or all of the residual pores are closed, i.e. non-interconnecting, is preferred since such a sintered body is impervious and highly resistant to internal oxidation at elevated temperatures. Also, the higher the density of the sintered product, the greater is its hardness.

The present invention makes it possible to fabricate complex shaped polycrystalline boron carbide ceramic articles directly which heretofore could not be manufactured or which were produced by expensive and tedious machining because of the hardness of the material. The present sintered product requires no machining and it can be made in the form of a useful complex shaped article, such as a gas turbine airfoil, an impervious crucible, a thin walled tube, a long rod, a spherical body. Specifically, the dimensions of the present sintered product differ from those of its green body by the extent of shrinkage, i.e. densification, which occurs during sintering. Also, the surface characteristics of the sintered body depend on those of the green body from which it is formed, i.e. it has a substantially smooth surface if the green body from which it is formed has a smooth surface.

The invention is further illustrated by the following example wherein all sintering or firing was carried out at atmospheric pressure in a carbon-element resistance furnace which was always initially purged with the sintering atmosphere.

EXAMPLE

A portion of a commercial boron carbide was characterized by spectrographic and chemical analysis. The powder was then calcined in low pressure argon (100 Torr) at 1480° C for 30 minutes and exhibited a weight loss of 9.8%. The calcined powder was also characterized by spectrographic and chemical analysis with the following results:

| | Boron Carbide Powder | |
|---|---|---|
| Composition % by wt. | Before Calcination | After Calcination |
| C | 21.1 | 22.9 |
| N | 0.3 | 0.3 |
| O | 4.4 | 0.55 |
| Fe | 1.0 | 1.0 |
| Mg | 2.0 | 2.1 |
| Ti | 0.002 | n.d |
| Al | 0.02 | n.d. |
| Si | n.d. | <0.05 |
| B/C Molar Ratio | — | 3.57 |
| Specific Surface Area m²/g | 17.2 | 16.1 |
| Mean Average Particle Size μ | .08 | — |

Elemental amorphous boron of submicron particle size was added to the calcined powder in an amount calculated to compensate for the hyperstoichiometric carbon determined by analysis and give a stoichiometric $B_4C$ composition. This powder was then used in preparing the samples of Table I. Specifically, 50 g. batches of the powder, with or without the $Be_2C$ additive, were milled dispersed in benzene for 5 hours with cemented carbide balls in plastic containers. Each dispersion was then dried and the powder screened through a 60-mesh sieve. For each sample of Table I, 2 grams of the resulting powder was pressed in a steel die at 6000 psi into a cylinder with a green density of about 60% of the theoretical 2.52 g/cc.

Each green cylinder was set on a carbon boat and fired in a nitrogen-argon atmosphere (1:1 flow rate) for 15 minutes at the temperature indicated. Temperature measurement was done with a pyrometer by directly viewing the sintering cylinder.

After sintering, diametral shrinkage, weight loss, and density were measured.

The density of the sintered body was determined by liquid displacement. The results in terms of density and fractional density based on theoretical specific weight 2.52 g/cc. for $B_4C$ are shown in Table I.

TABLE I

| Sample No. | Addition % by wt. based on $B_4C$ | Sint. Temp. % | SINTERED PRODUCT | | Shrinkage % |
|---|---|---|---|---|---|
| | | | Final Density | | |
| | | | g/cc | % | |
| 1 | none | 2120 | 1.65 | 65.5 | 4.2 |
| 2 | none | 2260 | 1.81 | 71.9 | 6.6 |
| 3 | 0.5 $Be_2C$ | 2130 | 2.05 | 81.6 | 9.4 |
| 4 | 1.0 $Be_2C$ | 2130 | 2.01 | 80.1 | 8.9 |
| 5 | same | 2230 | 2.14 | 85.5 | 11.0 |
| 6 | same | 2280 | 2.38 | 94.0 | 16.5 |
| 7 | same | 2300+ | — | partial melting | — |

As can be seen from Table I, Sample Nos. 1 and 2, where no Be$_2$C was added, produced sintered bodies of low density. In Sample Nos. 3 and 4, although Be$_2$C was added, the sintering temperatures were too low resulting in sintered bodies with low density.

Sample Nos. 5 and 6 illustrate the present invention and show that when Be$_2$C is added and the proper sintering temperature is used, high density sintered bodies of boron carbide are produced.

Figure 2:
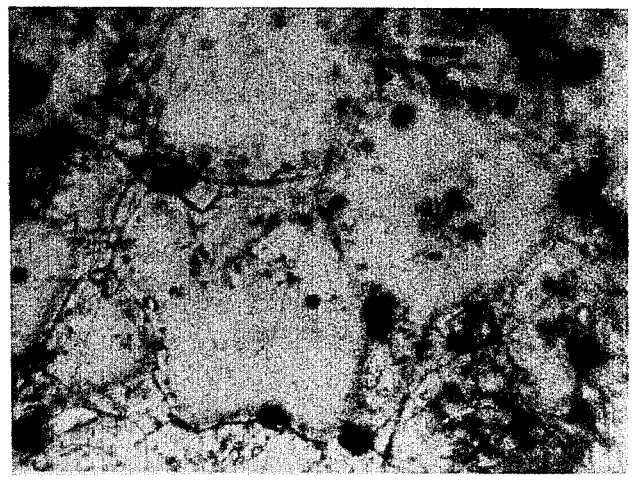
FIG. 2 is a photomicrograph (magnified 500 X) of the same specimen as FIG. 1, electrolytically etched in KOH showing the equiaxed crystals of boron carbide.

FIG. 1 shows the as-polished section of Sample No. 6 and FIG. 2 shows the same specimen as FIG. 1 electrolytically etched in KOH. As can be seen from FIG. 2, the microstructure shows large, equiaxed grains, approximately 300 μm in diameter, and large rounded off closed pores (dark spots) mainly at the grain boundaries. Some small spherical pores have been obviously trapped in the growing grains. There are also small grains about 1 to 2 microns in size of a second phase believed to be the Be$_2$C phase distributed near the large grain boundaries.

In copending U.S. patent application Ser. No. 632,481 entitled "Hot Pressed Silicon Carbide Containing Beryllium Carbide" filed of even date herewith in the name of Svante Prochazka and assigned to the assignee hereof, there is disclosed a dense polycrystalline silicon carbide body produced by hot pressing a particulate mixture of silicon carbide and beryllium carbide.

In copending U.S. patent application Ser. No. 632,495 entitled "Polycrystalline Silicon Carbide With Increased Conductivity" filed of even date herewith in the name of Svante Prochazka and assigned to the assignee hereof, there is disclosed polycrystalline silicon carbide with increased electrical conductivity at room temperatures produced by shaping a particulate mixture of β-silicon carbide, boron additive, beryllium carbide and a carbonaceous additive into a green body and sintering the body producing a sintered body having a density of at least about 85% of the theoretical density of silicon carbide.

What is claimed is:

1. A polycrystalline sintered body comprised of boron carbide wherein the boron/carbon molar ratio ranges from 3.5 to 4.5 and beryllium carbide in an amount ranging from 0.5% by weight to 3% by weight of said boron carbide, said sintered body having a substantially uniform microstructure composed of substantially equiaxed grains of said boron carbide having a grain size ranging from about 30 microns to about 300 microns with said beryllium carbide distributed substantially uniformly throughout said boron carbide and having a grain size less than 10 microns, said sintered body having a density ranging from 85% to about 96% of the theoretical density for said boron carbide.

2. The polycrystalline sintered body of claim 1 wherein the density is at least 90% and wherein substantially all of the residual pores are closed pores.

3. The polycrystalline sintered body of claim 1 wherein said boron carbide is of stoichiometric B$_4$C composition.

4. The polycrystalline sintered body of claim 1 in the form of a tube.

* * * * *